A. J. JOURDE.
HEAT-INDICATOR FOR STOVES.

No. 172,030. Patented Jan. 11, 1876.

WITNESSES:
Chas. Nida
Alex F. Roberts

INVENTOR:
A. J. Jourde
BY Munn & Co.
ATTORNEYS.

UNITED STATES PATENT OFFICE.

ALFRED J. JOURDE, OF ST. LOUIS, MISSOURI.

IMPROVEMENT IN HEAT-INDICATORS FOR STOVES.

Specification forming part of Letters Patent No. 172,030, dated January 11, 1876; application filed November 19, 1875.

*To all whom it may concern:*

Figure 1:
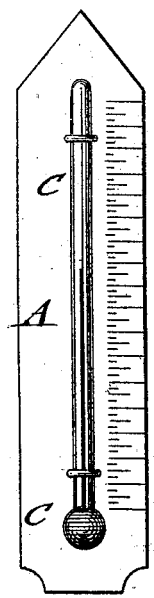
Figure 2:
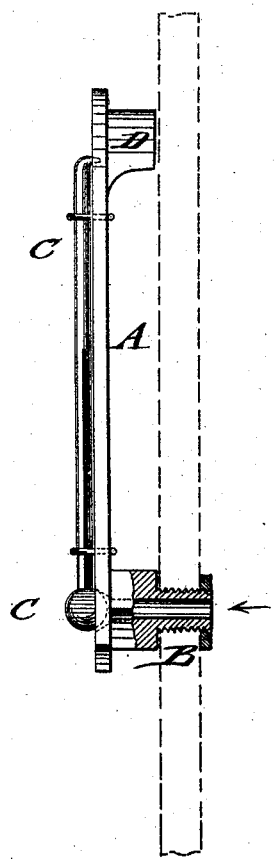

Be it known that I, ALFRED JOHN JOURDE, of the city and county of St. Louis, Missouri, have invented a new and Improved Heat-Indicator for Stoves, of which the following is a specification:

Figure 1 represents a front view, and Fig. 2 a side view, partly in section, of my improved heat-indicator for stoves.

Similar letters of reference indicate corresponding parts.

My invention relates to a thermometer attached to a cooking or heating stove for indicating the inside temperature of the same, so as to admit the proper regulation of the heat, produce a saving of fuel, and indicate also the proper heat for cooking and baking.

The invention consists of a thermometer that is screwed by a threaded tube of the graduated plate back of the mercury into a hole of the stove, and retained by projecting seats at suitable distance from the same.

In the drawing, A represents the graduated plate or scale of the thermometer or heat-indicator, which is made of suitable material, and attached to a stove to communicate with the inside of the same by a threaded tube, B, back of the mercury-bulb of the thermometer. The tube B opens the mercury-bulb, and admits thereby the action of the heat at the inside of the stove on the thermometer C. A top seat or projection, D, of the graduated plate bears against the stove when the threaded tube is screwed into the perforation of the stove, to provide thereby the secure attachment of the indicator at some distance from the wall of the stove.

The temperature inside the stove is indicated by the thermometer, and the supply of fuel regulated to keep the heat at a certain normal point.

The thermometer forms in this manner a useful and fuel-saving attachment to cooking and heating stoves.

Having thus described my invention, I claim as new and desire to secure by Letters Patent—

A thermometer provided at the graduated plate or scale with an open and threaded tube, extending backward from the mercury-bulb, to be screwed into the stove for indicating the temperature at the inside of the stove, substantially as specified.

A. J. JOURDE.

Witnesses:
C. E. SHEDD,
H. G. W. PIKE.